(12) United States Patent
Messas et al.

(10) Patent No.: US 12,507,963 B2
(45) Date of Patent: Dec. 30, 2025

(54) SYSTEM FOR PREDICTING A HAEMORRHAGIC STROKE

(71) Applicants: OCTOGONE MEDICAL, Paris (FR); UNIVERSITE PARIS CITE, Paris (FR); INSTITUT NATIONAL DE LA SANTE ET DE LA RECHERCHE MEDICALE, Paris (FR); ASSISTANCE PUBLIQUE HOPITAUX DE PARIS, Paris (FR)

(72) Inventors: Emmanuel Messas, Paris (FR); Frédéric Saldmann, Paris (FR)

(73) Assignees: OCTOGONE MEDICAL, Paris (FR); UNIVERSITE PARIS CITE, Paris (FR); INSERM (NSTITUT NATIONAL DE LA SANTE ET DE LA RECHERCHE MEDICALE, Paris (FR); ASSISTANCE PUBLIQUE HOPITAUX DE PARIS, Paris (FR)

( * ) Notice: Subject to any disclaimer, the term of this patent is extended or adjusted under 35 U.S.C. 154(b) by 301 days.

(21) Appl. No.: 18/548,950

(22) PCT Filed: Mar. 2, 2022

(86) PCT No.: PCT/FR2022/050369
§ 371 (c)(1),
(2) Date: Sep. 5, 2023

(87) PCT Pub. No.: WO2022/185008
PCT Pub. Date: Sep. 9, 2022

(65) Prior Publication Data
US 2024/0324966 A1    Oct. 3, 2024

(30) Foreign Application Priority Data

Mar. 4, 2021    (FR) ...................................... 2102119

(51) Int. Cl.
*A61B 5/00* (2006.01)
*A61B 5/02* (2006.01)
*A61B 5/021* (2006.01)
(Continued)

(52) U.S. Cl.
CPC .......... *A61B 5/7275* (2013.01); *A61B 5/0015* (2013.01); *A61B 5/02007* (2013.01);
(Continued)

(58) Field of Classification Search
CPC . A61B 5/7275; A61B 5/0015; A61B 5/02007; A61B 5/021; A61B 5/6822;
(Continued)

(56) References Cited

U.S. PATENT DOCUMENTS

2021/0022624 A1    1/2021 Lin

FOREIGN PATENT DOCUMENTS

WO    2007026281 A1    3/2007
WO    2011039580 A2    4/2011
(Continued)

*Primary Examiner* — Jonathan T Kuo
(74) *Attorney, Agent, or Firm* — WCF IP

(57) ABSTRACT

System (1) for predicting the risk of occurrence of a hemorrhagic stroke by analyzing the correlation between the carotid biomechanics, sentinel of the cerebral vascular system, and the blood pressure profile of a patient, comprising:
a monitoring device (2) capable of being positioned close to a carotid wall, the device comprising at least one vibration sensor (4) configured to measure mechanical waves generated by the arterial pulse wave or any other shear or compression wave propagated in said wall, a memory (8) capable of storing signals transmitted by the at least one vibration sensor, a communication interface (9), an energy source (7) configured to supply power to the at least one vibration sensor (4) and the communication interface (9),
an automatic blood pressure measuring device (20) for automatic measurement of the patient's blood pressure, said device being configured to emit a signal representative of the patient's blood pressure over time, the measurement device (20) being synchronized with the monitoring device (2),
a computing unit (10) for communicating with the monitoring device (2) and the automatic blood pressure measuring device (20) and configured to analyze mea-
(Continued)

surements from the monitoring device (2) and the automatic blood pressure measuring device (20) through artificial intelligence trained to correlate the measurements representative of the biomechanical state of the wall and the measurements representative of the blood pressure, in order to detect whether there is a risk of occurrence or recurrence of a hemorrhagic stroke in the patient.

9 Claims, 5 Drawing Sheets

(52) U.S. Cl.
CPC ............ *A61B 5/021* (2013.01); *A61B 5/6822* (2013.01); *A61B 5/6847* (2013.01); *A61B 5/7267* (2013.01); *A61B 2560/0219* (2013.01); *A61B 2560/045* (2013.01); *A61B 2560/0462* (2013.01); *A61B 2562/0219* (2013.01); *A61B 2562/0247* (2013.01)

(58) Field of Classification Search
CPC ................ A61B 5/6847; A61B 5/7267; A61B 2560/0219; A61B 2560/045; A61B 2560/0462; A61B 2562/0219; A61B 2562/0247; A61B 5/0024; A61B 5/6833; A61B 5/686; A61B 5/7246
See application file for complete search history.

(56) References Cited

FOREIGN PATENT DOCUMENTS

| | | |
|---|---|---|
| WO | 2018013569 A1 | 1/2018 |
| WO | 2018226809 A1 | 12/2018 | ns
SYSTEM FOR PREDICTING A HAEMORRHAGIC STROKE

TECHNICAL FIELD

The present disclosure relates to a system for predicting the risk of occurrence of a hemorrhagic stroke.

The present disclosure relates more particularly to a system and method making it possible to ensure continuous monitoring of the biomechanical state of the carotid wall, sentinel of the cerebral vascularization, in correlation with the blood pressure data in a patient and to predict the risk of occurrence of a hemorrhagic stroke.

PRIOR ART

A stroke is linked to a neuronal deficit due to ischemia or to a cerebral hemorrhage.

The brain is irrigated by the internal carotid artery and by all of the supra-aortic trunks providing the oxygen necessary for its functioning. The two types of stroke are ischemic stroke (IS) and hemorrhagic stroke. Hemorrhagic strokes represent 15 to 20% of strokes and are a result of intracerebral bleeding after an arterial rupture.

A hemorrhagic stroke causes a hematoma, the volume of which compresses the cerebral tissues and thereby prevents circulation in the affected region.

One of the main causes of a haemorrhagic stroke is uncontrolled acute arterial hypertension. High blood pressure over long periods of time forces the cardiovascular system and the arteries to work harder to move blood through the blood vessels. This extra effort promotes remodelling of the arterial wall, which initially undergoes hypertrophy and then stiffens, making it less compliant and more likely to rupture during hypertensive shocks. There are also other causes, for example an iatrogenic cause resulting from treatment with anticoagulants, especially in elderly subjects with weak arterial walls. In addition to these causes, there are identified risk factors, in particular diabetes, obesity, diet or smoking.

An object of the present disclosure is to propose a system and a method which make it possible to predict the occurrence of a hemorrhagic stroke by correlating the biomechanical properties of the carotid wall, sentinel of the cerebral vascularization, with the blood pressure profile of the patient, allowing targeted therapeutic adaptation in terms of, for example, the type of antihypertensive and antithrombotic treatment.

Another object of the present disclosure is to propose a system, for predicting the occurrence of a hemorrhagic stroke, which is not particularly restrictive as regards the patient and which is easy for the practitioner to use.

SUMMARY

The present disclosure will improve the situation.

A system for predicting the occurrence of a hemorrhagic stroke in a patient is proposed, comprising:
  a monitoring device capable of being positioned close to a carotid wall, the device comprising at least one vibration sensor configured to measure mechanical waves propagated in said wall, a memory capable of storing signals transmitted by the at least one vibration sensor, a communication interface, an energy source configured to supply power to the at least one vibration sensor and the communication interface,
  an automatic blood pressure measuring device for automatic measurement of the patient's blood pressure, said device being configured to emit a signal representative of the patient's blood pressure over time, the measurement device being synchronized with the monitoring device,
  a computing unit for communicating with the monitoring device and the automatic blood pressure measuring device and configured to analyze measurements from the monitoring device and the automatic blood pressure measuring device through artificial intelligence trained to correlate the measurements representative of the biomechanical state of the wall and the measurements representative of the blood pressure, in order to identify whether there is a risk of occurrence of a stroke in the patient.

The features set forth in the following paragraphs may optionally be implemented independently of one another or in combination with one another:

The monitoring device is in the form of a patch suitable for being affixed to an external surface of the skin of a patient.

The monitoring device is in the form of a subcutaneous implant suitable for being inserted under the skin of a patient.

The vibration sensor comprises an accelerometer.

The vibration sensor comprises a 3-axis accelerometer and a 3-axis gyroscope. The energy source is a battery rechargeable by induction.

The communication interface of the monitoring device is chosen from a short-range radio interface or a near-field communication interface.

The automatic blood pressure measuring device comprises a pressure sensor reacting to variations in the blood pressure of said patient, said pressure sensor being synchronized with the vibration sensor.

According to one embodiment, the prediction system additionally comprises at least one mobile communication device suitable for communicating remotely with the monitoring device and the automatic blood pressure measuring device and for transmitting signals to the computing unit via a long-range communication interface belonging to the computing unit.

According to another aspect, a method is proposed for predicting a risk of occurrence of a hemorrhagic stroke in a patient, using a system as described above, the method comprising:
  acquiring in a synchronized manner, over a predetermined period, a signal representative of the evolution of the biomechanical state of the carotid wall by means of the monitoring device and a signal representative of the evolution of the blood pressure by means of the automatic blood pressure measuring device;
  analyzing the signals in a computing unit using artificial intelligence trained to detect a correlation between the signal representative of the evolution of the biomechanical state of the carotid wall and the extremes in the signal representative of the evolution of the blood pressure, in order to predict the risk of occurrence of a haemorrhagic stroke.

According to one embodiment, the artificial intelligence used in the method is a neural network and the method further comprises a prior learning step comprising:
  acquiring a plurality of signals, called reference signals, from the monitoring device and the automatic blood pressure measuring device that are worn by a population of patients suffering from hypertension without haemorrhagic stroke, training the neural network with said reference signals until it converges.

BRIEF DESCRIPTION OF THE DRAWINGS

Other features, details and advantages will become apparent on reading the detailed description below and on analyzing the appended drawings, in which.

DESCRIPTION OF THE EMBODIMENTS

Figure 1:
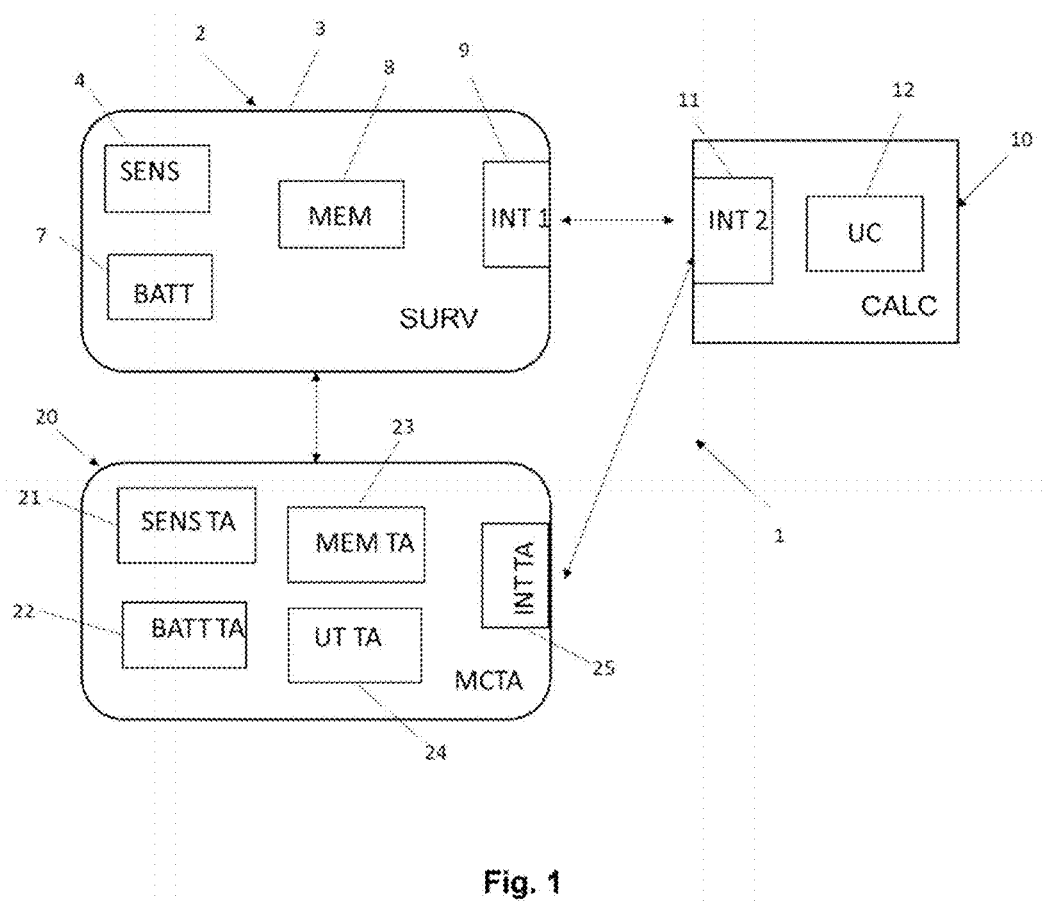
FIG. 1 is an illustration of a system according to one embodiment for predicting the risk of occurrence of a hemorrhagic stroke in a patient.

FIG. 1 illustrates an embodiment of a system 1 for predicting the risk of occurrence of a hemorrhagic stroke. The system 1 comprises a monitoring device 2 (SURV) configured to be placed close to the carotid artery or the supra-aortic trunks of a patient in order to measure the signals representative of the biomechanical state of the internal wall of the carotid artery, a device 20 (MCTA) for automatically measuring the blood pressure of the patient, synchronized with the monitoring device 2, and a computing unit 10 (CALC) suitable for communicating with the monitoring device 2 and the automatic blood pressure measuring device 20. The computing unit 10 is configured to analyze a correlation between the signals from the monitoring device 2 and the signals from the automatic blood pressure measuring device 20, in order to detect whether there is a risk of occurrence of a hemorrhagic stroke. Typically, the computing unit 10 can be operated by a practitioner or a group of practitioners and can collect and process data from a large number of monitoring devices 2 and automatic blood pressure measuring devices 20.

The monitoring device 2 can comprise one or two vibration sensors 4 (SENS); in particular one or two accelerometers, configured to measure mechanical waves passing through the carotid wall. The mechanical waves can be generated by the arterial pulse wave, for example. The mechanical wave comprises a shear component and a compression component and can be likened to a seismic wave.

By measuring the mechanical waves which propagate in the carotid wall, the vibration sensor 4 is capable of measuring a signal representative of the biomechanical properties of the carotid wall. The vibration sensor can comprise at least one accelerometer. For example, the vibration sensor can comprise a 3-axis accelerometer and a 3-axis gyroscope.

The monitoring device 2 also comprises a memory 8 (MEM), suitable for storing the signal measured and transmitted by the vibration sensor 4, and a communication interface 9 (INT 1) The communication interface 9 can be for example:

a short-range radio interface, in particular of the Bluetooth, Wifi or other type, or even a near-field communication interface, in particular of the NFC or RFID type.

The signal stored in the memory 8 can be transmitted to the computing unit 10 via the communication interface 9.

The automatic blood pressure measuring device 20 can be any device suitable for continuously and autonomously measuring the patient's blood pressure over a predetermined period of time.

The automatic blood pressure measuring device 20 can be, for example, an ambulatory blood pressure monitor (ABPM), also known as a Holter monitor, which allows blood pressure to be measured over a predetermined period of time. The device comprises a tensiometer worn by the patient and programmed to measure the blood pressure at regular intervals, every fifteen to twenty minutes during the day and every thirty to sixty minutes during sleep. The data are recorded in a box.

According to a variant, the pressure can be measured continuously, without interruption over a predetermined period of time.

According to an exemplary embodiment illustrated schematically in FIG. 1, the automatic blood pressure measuring device 20 comprises, for example, a pressure sensor 21 (SENS TA) which reacts to the variation in the patient's blood pressure. The sensor is, for example, applied to a region of the patient's body. The sensor therefore delivers a signal representative of the blood pressure in a blood vessel close to the sensor as a function of time. Thus, the signal notably comprises information representative of the variations in blood pressure. To be able to correlate the signal representative of the evolution of the biomechanical state of the carotid wall and the signal representative of the patient's blood pressure, the vibration sensor 4 and the pressure sensor 21 are synchronized in order to be able to initiate the two measurements simultaneously for the same predetermined duration, which is generally equal to twenty-four hours.

According to an exemplary embodiment, the automatic blood pressure measuring device 20 measures the blood pressure continuously, for example for twenty-four hours.

The device 20 also comprises a processing unit 24 (UT TA) which is configured to extract a signal representative of the blood pressure from the signal measured by the pressure sensor 21, a storage memory 23 (MEM TA) suitable for storing the signal representative of the blood pressure, and a communication interface 25 (INT TA) configured to transmit the signal representative of the blood pressure to the computing unit 10.

The communication interface 25 can be for example:

a short-range radio interface, in particular of the Bluetooth, Wifi or other type, or even a near-field communication interface, in particular of the NFC or RFID type.

According to an exemplary embodiment, the processing unit 24, the storage memory 23 and the communication interface 25 form a module separate from the pressure sensor 21. Thus, the automatic blood pressure measuring device 20 comprises, for example, an armband or a wristband, in which is integrated a pressure sensor 21, and a box placed at a distance from the sensor 21 and integrating the processing unit 24, the storage memory 23 and the communication interface 25. The armband or wristband is worn by the patient so that the pressure sensor is in contact with the patient's skin. The box can also be worn by the patient using a belt.

The computing unit 10 is configured to analyze the signal from the monitoring device 2 and the signal from the automatic blood pressure measuring device 20 using artificial intelligence trained to detect a correlation between the signal representative of the biomechanical state of the carotid wall and the signal representative of blood pressure, in order to predict the risk of occurrence of a hemorrhagic stroke. It is this correlation that will make it possible to provide reliable information on the risk of intracerebral rupture.

The computing unit comprises, for example, a central unit 12 (UC), in which a trained neural network is stored. The computing unit 10 also comprises a communication interface 11 (INT 2) for receiving the signals coming from the monitoring device 2 and from the automatic blood pressure measuring device 20. The communication interface 11 and the central unit 12 may optionally be remote from each other. The central unit 12 may optionally be a server.

Figure 2:
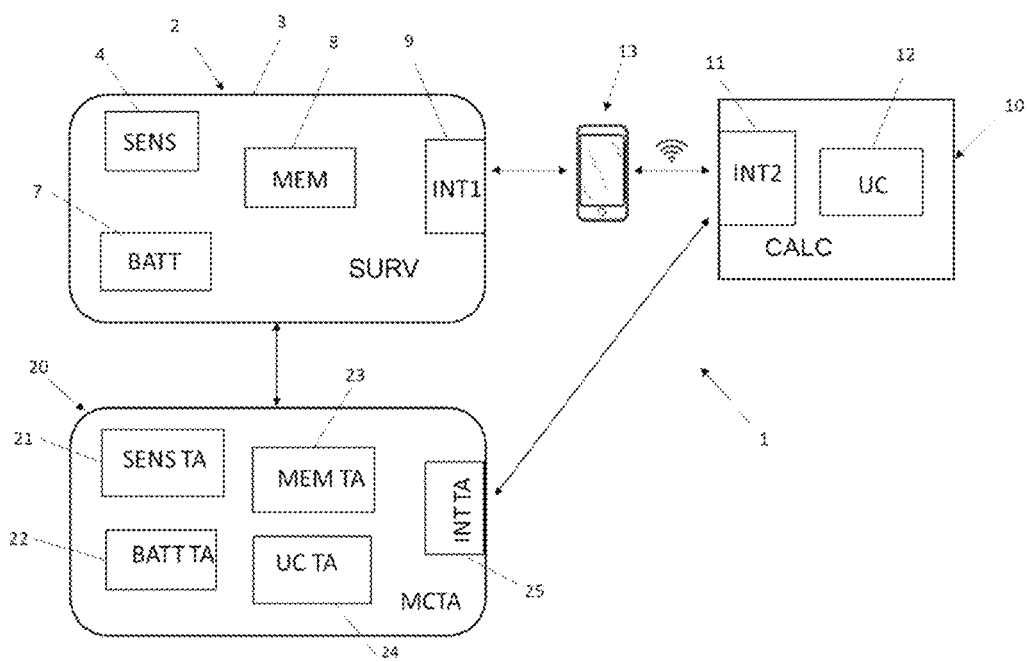
FIG. 2 is an illustration of a system according to another embodiment for predicting the risk of occurrence of a hemorrhagic stroke.

A prediction system according to another embodiment is described with reference to FIG. 2. It further comprises a mobile communication device 13 communicating with the monitoring device 2 and the automatic blood pressure measuring device 20 via a short-range communication interface. The mobile communication device 13 comprises an application via which the patient, wearing the monitoring device 2 and the automatic blood pressure measuring device 20, can retrieve the signal representative of the biomechanical state of the carotid wall, stored in the memory 8 of the monitoring device 2, and the signal representative of the blood pressure, stored in the memory 23 of the automatic blood pressure measuring device 20.

The mobile communication device 13 can also be placed in communication with the computing unit 10. The mobile communication device can, for example, transmit the recovered signals via a communication interface of the 2G, 3G, 4G or 5G type.

The mobile communication device can be, for example, a smart phone or a smart watch.

The monitoring device 2 is an autonomous device. The monitoring device 2 comprises an energy source 7 (BATT) which, for example, can be rechargeable by an external device, in particular by induction. The battery and the electronic components of the monitoring device can be chosen such that the autonomy of the device is at least equal to one day.

The automatic blood pressure measuring device 20 also comprises an energy source 22 (BATT TA) which allows the blood pressure measuring device to operate autonomously. This energy source can, for example, be rechargeable by an external device, in particular by induction. The battery and the electronic components of the measuring device 20 can be chosen such that the autonomy of the device is at least equal to 1 day.

Figure 3A:
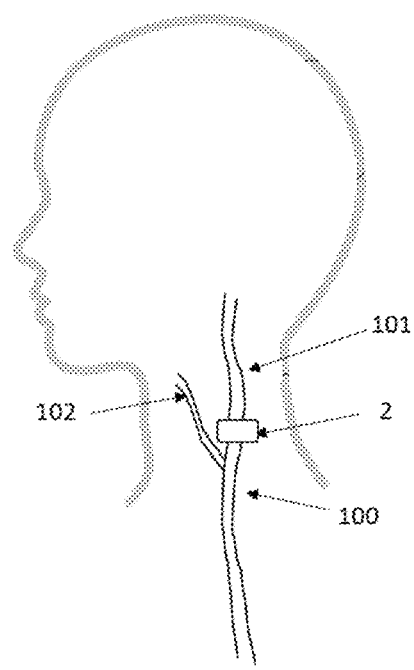
FIG. 3A shows the device for monitoring the biomechanical state of the carotid wall, positioned at the level of the neck of a patient, close to the internal carotid artery after the bifurcation of the common carotid artery.
Figure 3B:
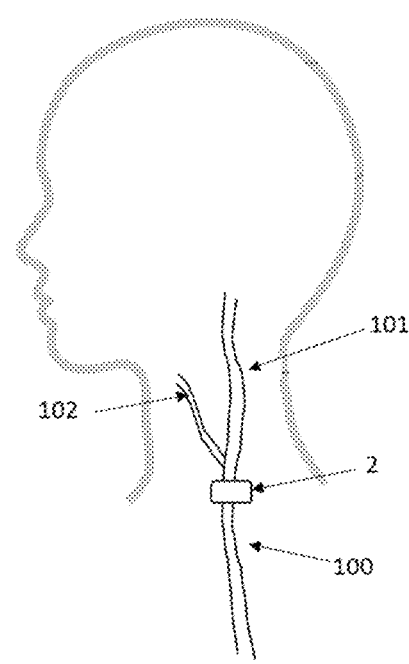
FIG. 3B shows the device for monitoring the biomechanical state of the carotid wall, positioned at the level of the neck of a patient, close to the common carotid artery before the bifurcation of the common carotid artery.

FIGS. 3A and 3B illustrate a schematic view of a common carotid artery 100 which divides in two at the neck of a patient: the internal carotid artery 101, which will irrigate the brain, and the external carotid artery 102, which will irrigate the neck and face. According to an exemplary embodiment and with reference to FIG. 3A, the monitoring device 2 as described above can be placed facing the internal carotid artery 101 just after the bifurcation of the common carotid artery, so as to continuously measure the signal coming from the wall. According to another exemplary embodiment and with reference to FIG. 3B, the monitoring device 2 as described above can also be placed facing the common carotid artery 100 just before the bifurcation of the common carotid artery.

In general, the positioning of the monitoring device 2 can be adjusted according to the clinical requirements. According to another embodiment, it is also possible to position a second monitoring device or even several devices to monitor not only the internal carotid artery but also its branches or any other artery of the supra-aortic trunks. By way of example, it is possible to position a second monitoring device just before the bifurcation of the common carotid artery 100.

Figure 4:
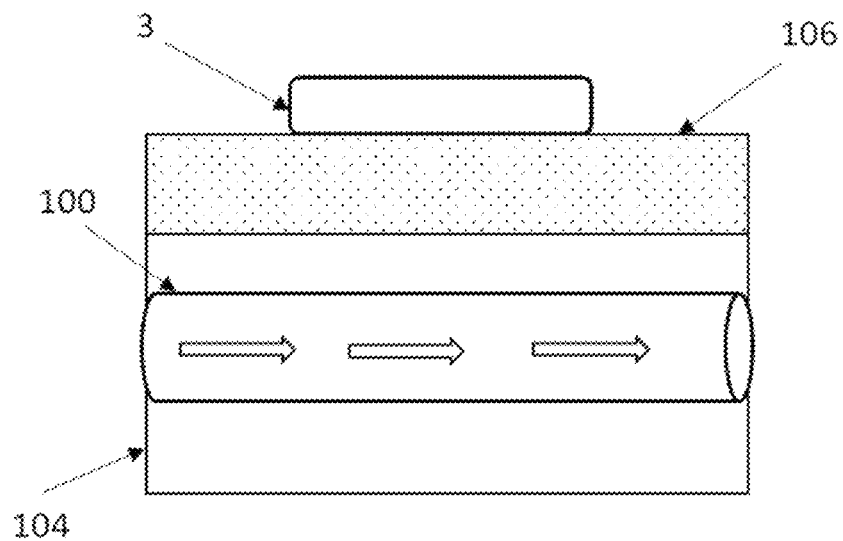
FIG. 4 shows an exemplary embodiment of the monitoring device affixed to an external surface of the skin, close to the carotid artery.

Referring to FIG. 4, the monitoring device 2 is in the form of a patch 3 having an adhesive surface which allows the device to be affixed to a region of the external surface of the skin 106 of the neck, close to the common carotid artery 100 or close to the internal carotid artery 101. The blood flow in the carotid artery 100 is shown by arrows in FIG. 4.

Figure 5:
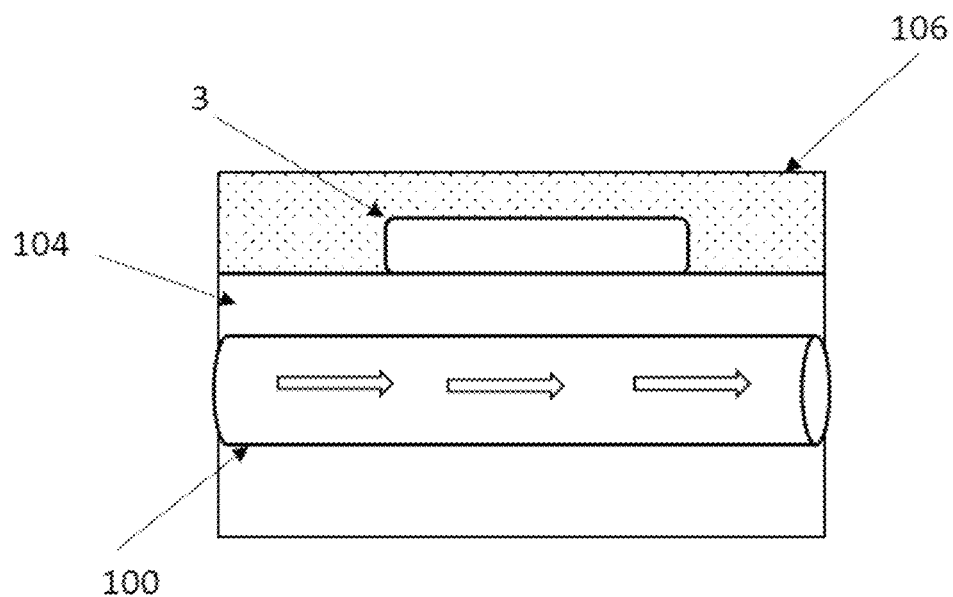
FIG. 5 shows another exemplary embodiment of the monitoring device implanted under the skin, close to the carotid artery.

With reference to FIG. 5, the monitoring device 2 can also be a subcutaneous implantable device 3. The monitoring device 2 comprises, for example, an envelope made of a biocompatible material. The monitoring device is placed in an implantable probe. It can be placed under the skin 106, close to the common carotid artery 100 or close to the internal carotid artery 101. It is put in place by the practitioner, who creates a detachment under the skin. The device is placed in contact with the muscle 104 under the skin.

Figure 6:
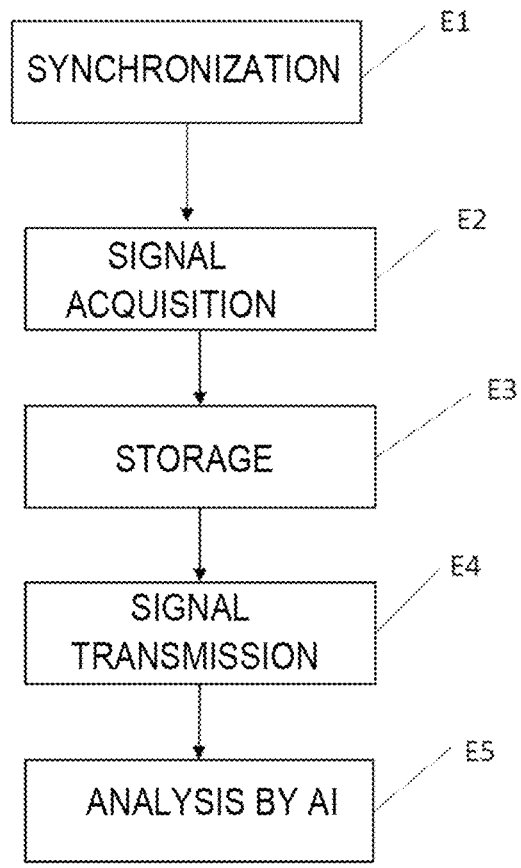
FIG. 6 is a flowchart representing the method for predicting the risk of occurrence of a hemorrhagic stroke, implemented by the prediction system according to one embodiment.

With reference to FIG. 6, a method implementing a system for predicting the risk of occurrence of a hemorrhagic stroke is described below.

In step E1, the vibration sensor 4 of the monitoring device and the blood pressure sensor 21 of the automatic blood pressure measuring device 20 are synchronized in order to be able to initiate the signal measurement phase.

In step E2, the two sensors 4, 21 perform the measurements for a predetermined period. The duration varies from a few hours to a day or longer. The two sensors are, for example, previously programmed to operate for a predetermined duration. This duration is determined by the practitioner according to the clinical requirements. Preferably, this duration is twenty-four hours.

In step E3, the signal representative of the biomechanical state of the carotid wall and the signal representative of the blood pressure are stored respectively in the memory 8 of the monitoring device 2 and the memory 23 of the automatic blood pressure measuring device 20.

In step E4, the stored signals are sent to the computing unit 10 via the communication interface 9 of the monitoring device 2 and the communication interface 25 of the measuring device 20.

In step E5, the computing unit 10 analyzes the signals by means of artificial intelligence trained to detect a correlation between the signal representative of the evolution of the biomechanical state of the wall of the carotid artery and the extremes in the signal representative of the evolution of blood pressure, in order to predict the risk of occurrence of a hemorrhagic stroke. The artificial intelligence comprises a neural network trained to determine, from the signals collected from the patient, whether the latter is at risk of a hemorrhagic stroke.

Steps E1 to E5 are, for example, carried out by the practitioner on a patient who presents one or more typical signs or symptoms associated with a stroke. It is thus possible for the practitioner to obtain a reliable prediction on the risk of occurrence of a hemorrhagic stroke in the patient and to be able to propose an appropriate treatment protocol.

Alternatively, steps E1 to E4 are, for example, performed by the patient at home. The patient can also use a mobile communication device 13 to communicate with the monitoring device and with the automatic blood pressure measuring device periodically via a short-range communication interface. The device is a smart phone, for example. It comprises, for example, an application by which the patient can interrogate the monitoring device 2 and the automatic blood pressure measuring device 20 so as to receive the signals stored in the memories 8, 23. The communication device 13 then transmits the signals via a 4G or 5G network to the computing unit 10. Thus, a diagnosis of the evolution of the biomechanical state of the arterial wall in correlation with the blood pressure can be established remotely by the practitioner periodically, for example once a week.

Figure 7:
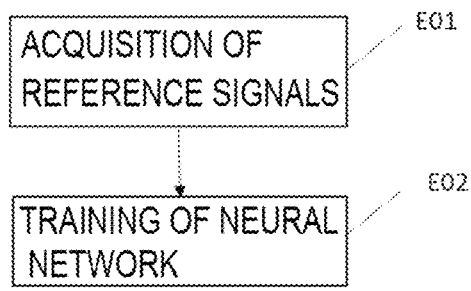
FIG. 7 is a flowchart representing the learning step for training the neural network.

According to one embodiment and with reference to FIG. 7, when the artificial intelligence is a neural network, the method can additionally comprise a preliminary learning step to train the artificial intelligence in such a way as to determine, from signals collected from the patient, if the latter presents a risk of occurrence of a hemorrhagic stroke.

More specifically, the learning step can comprise the following sub-steps.

At a sub-step E01, a plurality of devices 2 for monitoring the biomechanical state of the carotid wall and of devices 20 for automatic and continuous blood pressure measurement are used to collect signals from a population suffering from hypertension but not at risk of hemorrhagic stroke. The signals, called reference signals, are stored on a server.

At a sub-step E02, the neural network is trained with the reference signals until the network converges. The trained neural network is then stored in the computing unit 10, in particular in the central unit 12.

By virtue of the continuous acquisition of a set of signals representative of the evolution of the biomechanical state of the carotid wall and of the evolution of the blood pressure and to the use of artificial intelligence for analyzing the correlation between the signal representative of the biomechanical state of the carotid wall and the extremes of the blood pressure signal, the system of the present disclosure makes it possible to predict the risk of occurrence of a hemorrhagic stroke. The present system can be used by the practitioner, as a complement to morphological and histological studies, to identify the patient presenting a risk of a hemorrhagic stroke, in order to propose appropriate antihypertensive treatment.

Moreover, the use of the system is not limited solely to predicting a hemorrhagic stroke. It can be implemented in a patient after the occurrence of a hemorrhagic stroke, in order to predict the risk of recurrence after treatment.

The system of the present disclosure also makes it possible to carry out a post-therapeutic evaluation of the improvement in the biomechanical response of the carotid wall to the treatment.

The system can also be applied during a clinical trial in order to assess the effectiveness of a new preventive treatment for hemorrhagic stroke.

The invention claimed is:

1. A system for predicting the risk of occurrence of a hemorrhagic stroke in a patient, comprising:
a monitoring device capable of being positioned close to a carotid wall, the monitoring device comprising at least one vibration sensor configured to measure mechanical waves propagated in said carotid wall, a memory capable of storing signals transmitted by the at least one vibration sensor, a communication interface, an energy source configured to supply power to the at least one vibration sensor and the communication interface,
an automatic blood pressure measuring device for automatic measurement of the patient's blood pressure, said device being configured to emit a signal representative of the patient's blood pressure over time, the automatic blood pressure measuring device being synchronized with the monitoring device,
a computing unit for communicating with the monitoring device and the automatic blood pressure measuring device and configured to analyze measurements from the monitoring device and the automatic blood pressure measuring device through artificial intelligence trained to correlate measurements representative of the biomechanical state of the carotid wall and measurements representative of the blood pressure, in order to identify whether there is a risk of occurrence of a hemorrhagic stroke in the patient.

2. The system as claimed in claim 1, in which the monitoring device is a patch suitable for being affixed to an external surface of skin of a patient.

3. The system as claimed in claim 1, in which the monitoring device is a subcutaneous implant suitable for being inserted under the skin of a patient.

4. The system as claimed in claim 1, in which the at least one vibration sensor comprises an accelerometer.

5. The system as claimed in claim 4, in which the at least one vibration sensor comprises a 3-axis accelerometer and a 3-axis gyroscope.

6. The system as claimed in claim 1, in which the energy source is a battery rechargeable by induction.

7. The system as claimed in claim 1, in which the communication interface is a short-range radio interface or a near-field communication interface.

8. The system as claimed in claim 1, in which the automatic blood pressure measuring device comprises a pressure sensor reacting to variations in blood pressure of said patient, said pressure sensor being synchronized with the at least one vibration sensor.

9. The system as claimed in claim 1, further comprising at least one mobile communication device suitable for communicating remotely with the monitoring device and the automatic blood pressure measuring device and for transmitting signals to the computing unit via a long-range communication interface belonging to the computing unit.

* * * * *